US012559612B2

(12) United States Patent
Baione et al.

(10) Patent No.: US 12,559,612 B2
(45) Date of Patent: Feb. 24, 2026

(54) TYRE FOR VEHICLE WHEELS

(71) Applicant: Pirelli Tyre S.p.A., Milan (IT)

(72) Inventors: Francesca Baione, Milan (IT);
Fernando Moretti, São Paulo (BR);
Fabrizia Sala, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 870 days.

(21) Appl. No.: 17/627,501

(22) PCT Filed: Jul. 23, 2020

(86) PCT No.: PCT/IB2020/056936
§ 371 (c)(1),
(2) Date: Jan. 14, 2022

(87) PCT Pub. No.: WO2021/014394
PCT Pub. Date: Jan. 28, 2021

(65) Prior Publication Data
US 2022/0259414 A1 Aug. 18, 2022

(30) Foreign Application Priority Data
Jul. 24, 2019 (IT) ........................ 102019000012780

(51) Int. Cl.
| | |
|---|---|
| *C08L 9/06* | (2006.01) |
| *B60C 1/00* | (2006.01) |
| *C08K 3/36* | (2006.01) |
| *C08K 5/544* | (2006.01) |
| *C08K 5/548* | (2006.01) |

(52) U.S. Cl.
CPC .............. *C08L 9/06* (2013.01); *B60C 1/0025* (2013.01); *C08K 3/36* (2013.01); *C08K 5/544* (2013.01); *C08K 5/548* (2013.01); *C08K 2201/014* (2013.01)

(58) Field of Classification Search
CPC .. C08L 9/06; C08K 3/36; C08K 5/544; C08K 5/548
USPC ........................................................ 523/156
See application file for complete search history.

(56) References Cited

U.S. PATENT DOCUMENTS

| | | |
|---|---|---|
| 2002/0198305 A1 | 12/2002 | Hopkins |
| 2008/0251174 A1 | 10/2008 | Romani et al. |
| 2011/0105669 A1 | 5/2011 | Ignatz-Hoover et al. |
| 2013/0035437 A1 | 2/2013 | Pan et al. |
| 2013/0331480 A1 | 12/2013 | Suzuki et al. |
| 2015/0203662 A1 | 7/2015 | Yan et al. |
| 2016/0168365 A1 | 6/2016 | Suzuki et al. |
| 2018/0079891 A1 | 3/2018 | Yan et al. |

FOREIGN PATENT DOCUMENTS

| | | | |
|---|---|---|---|
| CN | 102858862 A | 1/2013 | |
| CN | 102875840 A | 1/2013 | |
| CN | 103298871 A | 9/2013 | |
| DE | 100 15 308 A1 | 10/2001 | |
| EP | 1 236 767 A2 | 9/2002 | |
| EP | 2 193 036 B1 | 9/2011 | |
| EP | 2 679 626 A1 | 1/2014 | |
| EP | 2 231 759 B1 | 11/2017 | |
| JP | 2007-31581 A | 2/2007 | |
| WO | WO-0192402 A1 * | 12/2001 | ........... B60C 1/0016 |
| WO | WO-2006066615 A1 * | 6/2006 | ........... B60C 1/0016 |
| WO | WO 2011/106765 A2 | 9/2011 | |

OTHER PUBLICATIONS

International Search Report form the European Patent Office in corresponding International Application No. PCT/IB2020/056936 mailed Sep. 30, 2020.
Written Opinion of the International Searching Authority from the European Patent Office in corresponding International Application No. PCT/IB2020/056936 mailed Sep. 30, 2020.
Notification of the First Office Action issued by the China National Intellectual Property Administration on Feb. 27, 2023, in corresponding Application No. CN 202080053586.1 (6 pages).

* cited by examiner

*Primary Examiner* — Deve V Hall
(74) *Attorney, Agent, or Firm* — Finnegan, Henderson, Farabow, Garrett & Dunner, L.L.P.

(57) ABSTRACT

The present invention relates to a tyre comprising at least one structural element including a cross-linked elastomeric material obtained by cross-linking a cross-linkable elastomeric composition comprising per 100 phr of vulcanisable polymer: (a) from 90 to 10 phr of at least one non-functionalised elastomeric polymer; (b) from 10 to 90 phr of at least one functionalised elastomeric polymer; (c) from about 10 phr to about 120 phr, preferably about 20 phr to about 90 phr of at least one white reinforcing filler; (d) from about 5% to about 15% by weight with respect to the amount of white reinforcing filler of a mixture of silanes, said mixture comprising at least one sulfur-silane and at least one amino-silane.

16 Claims, 3 Drawing Sheets

TYRE FOR VEHICLE WHEELS

This application is a national stage filing under 35 U.S.C. § 371 of International Application No. PCT/IB2020/056936, filed on Jul. 23, 2020, which claims priority to Italian Patent Application No. 102019000012780, filed on Jul. 24, 2019; the contents of each application is incorporated herein by reference in their entirety.

FIELD OF INVENTION

The present invention relates to a tyre for vehicle wheels comprising a cross-linked elastomeric material obtained by vulcanisation of a vulcanisable elastomeric composition comprising at least one functionalised polymer and at least one non-functionalised polymer, and silica as a reinforcing filler, characterised by the incorporation of special silane mixtures able to improve the performance of the tyre, in particular the balance between rolling resistance and mechanical properties.

STATE OF THE ART

In the tyre industry, vulcanisation is a process commonly used to give the elastomeric compositions of tyre components the necessary mechanical properties. Such a process influences the static and dynamic modules as well as the hysteresis of the elastomeric compositions at different temperatures and, consequently, the behaviour of the tyre on dry or wet surfaces as well as its rolling resistance and its resistance to tearing and abrasion during use.

The vulcanization process typically uses sulfur to promote cross-linking of the elastomeric composition reinforced for example with carbon black to improve the mechanical properties of the finished product.

However, the use of high amounts of sulfur can cause considerable reversion phenomena, resulting in a change in tyre performance during use, while the use of high amounts of carbon black provides pronounced hysteresis properties, i.e. an increase in heat dissipation under dynamic conditions, which results in increased tyre rolling resistance and fuel consumption.

To overcome the drawbacks caused by the use of carbon black, so-called white reinforcing fillers, in particular silica, can be used as a total or partial replacement for carbon black.

However, although the use of said white reinforcing fillers leads to less hysteresis and consequently lower rolling resistance, it also implies a reduction in mechanical properties, in particular tear resistance, due essentially to the low affinity of these fillers with the elastomeric polymers commonly used in the production of tyres.

In particular, to obtain a good degree of silica dispersion in elastomeric polymers, it is necessary to subject the elastomeric compositions to a prolonged thermomechanical mixing action ("silicification" process), and to increase the affinity of silica with elastomeric polymers, it is necessary to use suitable coupling agents, such as, for example, organosilane products containing sulfur ("silanisation" process).

However, the need to use such coupling agents places a limit on the maximum temperature that can be reached during mixing and thermomechanical processing of elastomeric compositions to avoid irreversible thermal degradation of the coupling to agents.

In order to overcome the above drawbacks, the introduction of other compounds capable of promoting the reaction of silica with the coupling agent, thus improving the interaction with elastomeric polymers, as described for example in EP2193036 and EP2231759, has been suggested in the art.

Although the solutions proposed in the art have brought improvements, the tyre industry has shown a continuous interest in finding new solutions to achieve optimal performance in terms of mechanical properties and hysteresis, while maintaining good stability, workability and kinetics of vulcanisation of the elastomeric composition.

SUMMARY OF THE INVENTION

The Applicant has undertaken studies to further improve the effectiveness of coupling agents in the production of tyre compounds, with the aim of obtaining a better balance of the vulcanisation curve by obtaining good hysteresis values without affecting the mechanical properties of the vulcanisation product, i.e. the cross-linked elastomeric material.

Surprisingly, the Applicant has found that through the use of a mixture comprising two different types of silanes, in particular at least one sulfur-silane and at least one amino-silane, in an elastomeric composition comprising at least one functionalized polymer and at least one non-functionalized polymer, it is possible to modulate the final properties of the cross-linked elastomeric material according to the required performance.

In particular, the Applicant has observed that the employed silane mixture was capable of simultaneously improving static mechanical properties, in particular elongation modulus and tear resistance, and dynamic mechanical properties, in particular tan $\delta$ values at medium and high temperatures with a significant reduction in hysteresis and rolling resistance.

At the same time, the Applicant has observed a higher value of silanisation yield during the first mixing phase, which may allow a reduction in the amount of coupling agent and ensure the absence of free silane, in particular sulfur-silane, and consequently a more stable system, as sulfur-silane could act as a sulfur donor and trigger the vulcanization.

Furthermore, the Applicant has verified that the vulcanisation curve is influenced by the relative ratios between the two types of silane, thus allowing to optimise the reaction kinetics according to the results required for each type of elastomeric composition.

In particular, the Applicant has observed that by increasing the percentage of amino-silane the vulcanisation curve varies from the typical form with incremental modulus to a form comprising modulus values reaching a constant maximum and again to a form comprising a regression of the modulus value. In addition, the vulcanisation kinetics is faster allowing shorter vulcanisation cycles during industrial production.

Finally, the Applicant has observed that the viscosity and scorch values remained within acceptable values, thus allowing a good workability of the elastomeric composition to be maintained.

Therefore, a first aspect of the present invention is a tyre comprising at least one structural element including a cross-linked elastomeric material obtained by cross-linking a cross-linkable elastomeric composition comprising per 100 phr of vulcanisable polymer:

(a) from 90 to 10 phr of at least one non-functionalised elastomeric polymer;

(b) from 10 to 90 phr of at least one functionalised elastomeric polymer;

(c) from about 10 phr to about 120 phr, preferably about 20 phr to about 90 phr of at least one white reinforcing filler;

(d) from about 5% to about 15% by weight with respect to the amount of white reinforcing filler of a mixture of silanes, said mixture comprising at least one sulfur-silane and at least one amino-silane.

According to a preferred embodiment, the tyre of the present invention comprises:

a carcass structure, having opposite side edges associated with respective left and right bead structures;

a tread band applied in a radially external position with respect to said carcass structure;

a pair of sidewalls laterally applied on the opposite sides of said carcass structure.

In a second aspect, the present invention relates to a cross-linkable elastomeric composition comprising per 100 phr of vulcanisable polymer:

(a) from 90 to 10 phr of at least one non-functionalised elastomeric polymer;

(b) from 10 to 90 phr of at least one functionalised elastomeric polymer;

(c) from about 10 phr to about 120 phr, preferably about 20 phr to about 90 phr of at least one white reinforcing filler;

(d) from about 5% to about 15% by weight with respect to the amount of white reinforcing filler of a mixture of silanes, said mixture comprising at least one sulfur-silane and at least one amino-silane.

According to a preferred embodiment, said silane mixture comprises from 50% to 99% by weight, with respect to the total quantity of mixture, of at least one sulfur-silane and from 50% to 1% by weight, with respect to the total quantity of mixture, of at least one amino-silane.

Definitions

For the purposes of the present description and the following claims, the term 'phr' (parts per hundreds of rubber) means the parts by weight of a given component of the elastomeric composition per 100 parts by weight of the dienic elastomeric polymer (vulcanisable polymer). Unless otherwise stated, all percentages are expressed as percentages by weight.

In the present description and claims, the term "elastomeric polymer" or "rubber" or "elastomer" represents a natural or synthetic vulcanisable polymer which, after vulcanization, at room temperature can be repeatedly stretched to at least twice its original length and which after removal of tensile stress returns substantially immediately and forcefully to its approximately original length (as defined in ASTM D1566-11 Standard terminology relating to Rubber).

For the purposes of the present description and the following claims, the term 'functionalised elastomeric polymer' means an elastomeric polymer which includes at least one functional group selected from the group consisting of carboxyl groups, carboxylated groups, anhydride groups, ester groups, epoxy groups, or mixtures thereof, while the term 'non-functionalised elastomeric polymer' means an elastomeric polymer which does not include any functional group.

The term 'functional group' means any functional group comprising one or more specifically linked atoms, where at least one of said atoms is different from C and H, which provides chemical and/or reactive properties to the elastomeric polymer to which it is linked, such as for example, halides, carboxyl groups, carboxylate groups, anhydride groups, ester groups, epoxy groups, aldehyde groups, alcoholic groups, ketone groups, amine groups, and so on.

In the present description and claims, the term 'elastomeric composition' means the product obtained by mixing and, optionally, heating at least one elastomeric polymer with at least one of the additives commonly used in the preparation of elastomeric compositions for tyres. The elastomeric composition is made 'vulcanisable' by the presence of vulcanising agents in the composition itself.

In the present description and claims, the term 'cross-linked elastomeric material' means the material obtained by vulcanisation of a vulcanisable elastomeric composition.

In the present description and claims, the term "green" is generally used to refer to an material, compound, component or tyre not yet vulcanised.

In the present description and claims, the term "reinforcing filler" refers to a reinforcing material typically used in the industry to improve the mechanical properties of pneumatic tyres.

DETAILED DESCRIPTION OF THE INVENTION

The present invention, in at least one of the aspects mentioned above, may exhibit one or more of the preferred features described below.

According to a preferred embodiment, said at least one non-functionalized elastomeric polymer (a) can be selected, for example, from ($a_1$) dienic elastomeric polymers that are commonly used in sulfur cross-linkable elastomeric compositions, which are particularly suitable for producing tyres, i.e. between elastomeric polymers or elastomeric copolymers with an unsaturated chain having a glass transition temperature (Tg) generally below about 20° C., preferably in the range from about 0° C. to about –110° C.

Preferably, the diene elastomeric polymer has a weight average molecular weight above 80,000 g/mol.

These polymers or copolymers may be of natural origin or may be obtained by solution polymerisation, emulsion polymerisation or gas phase polymerisation of one or more conjugated diolefins, possibly mixed with at least one comonomer selected from monovinylarenes and/or polar comonomers in a quantity not exceeding 60% by weight.

Conjugated diolefins generally contain 4 to 12, preferably 4 to 8 carbon atoms and can be selected from, for example, the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof. 1,3-butadiene and isoprene are particularly preferred.

Monovinylarenes, which may possibly be used as comonomers, generally contain 8 to 20, preferably 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene such as, for example, α-methylstyrene, 3-methylstyrene, 4-propylstyrene, 4-cyclohexystyrene, 4-dodecylstyrene, 2-ethyl-4-benzylstyrene, 4-(4-phenylbutyl)styrene, and mixtures thereof. Styrene is particularly preferred.

Polar comonomers, which may possibly be used, may be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, acrylonitrile and mixtures thereof.

Preferably, the non-functionalized dienic elastomeric polymer that can be used in the present invention can be selected, for example, from: cis-1,4-polyisoprene (natural or synthetic, preferably natural rubber), 3,4-polyisoprene, polybutadiene (especially polybutadiene with a high content of 1,4-cis), isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

Alternatively, said at least one elastomeric polymer (a) may be selected, for example, from (a$_2$) elastomeric polymers of one or more monoolefins with an olefinic comonomer or derivatives thereof. Monoolefins may be selected from: ethylene and α-olefins generally containing 3 to 12 carbon atoms, such as, for example, propylene, 1-butene, 1-pentene, 1-hexene, 1-octene and mixtures thereof. The following are preferred: copolymers between ethylene and an α-olefin, possibly with a diene; isobutene homopolymers or copolymers thereof with small amounts of a diene. The diene, if present, generally contains between 4 and 20 carbon atoms and is preferably selected from: 1,3-butadiene, isoprene, 1,4-hexadiene, 1,4-cyclohexadiene, 5-ethylene-2-norbornene, 5-methylene-2-norbornene, vinylnorbornene and mixtures thereof. The following are particularly preferred: ethylene/propylene copolymers (EPR) or ethylene/propylene/diene copolymers (EPDM); polyisobutene; butyl rubbers; or mixtures thereof.

According to a preferred embodiment, said at least one functionalised elastomeric polymer (b) may be selected from the elastomeric polymers (a) listed above which include at least one functional group selected from the group consisting of carboxylic groups, carboxylate groups, anhydride groups, ester groups, epoxy groups, or mixtures thereof.

The functional group may be introduced into the elastomeric polymer by processes known in the art, such as, for example, during production of the elastomeric polymer by copolymerisation with at least one corresponding functionalised monomer containing at least one ethylene unsaturation; or by subsequent modification of the elastomeric polymer by grafting of at least one functionalised monomer in the presence of a free radical initiator (e.g. an organic peroxide).

Alternatively, functionalization can be introduced by reaction with suitable termination agents or coupling agents. In particular, elastomeric diene polymers (a$_1$) obtained by anionic polymerization in the presence of an organometallic initiator (in particular an organolithium initiator) may be functionalized by reacting the residual organometallic groups derived from the initiator with suitable terminating agents or coupling agents such as, for example, imines, carbodiimides, tin alkyl halides, substituted benzophenones, alkoxysilanes or aryloxysilanes.

Preferably, said at least one functionalised elastomeric polymer (b) is obtained from polybutadiene (in particular polybutadiene with a high content of 1,4-cis), styrene/1,3-butadiene copolymers, styrene/isoprene/1,3-butadiene copolymers, styrene/1,3-butadiene/acrylonitrile copolymers, and mixtures thereof.

Advantageously, said at least one functionalised elastomeric polymer (b) is obtained from styrene/1,3-butadiene copolymers.

Preferably, said at least one functionalised elastomeric polymer (b) shall comprise a quantity of functional groups between 0.05% by weight and 10% by weight, preferably 0.1% by weight to 5% by weight with respect to the total weight of the functionalised elastomeric polymer (b).

The amount used of the mixture of at least one non-functionalised elastomeric polymer and at least one functionalised elastomeric polymer as defined above shall be 100 phr in total.

The white reinforcing filler (c) can be any conventional white reinforcing filler.

The white reinforcing filler is preferably selected between silica and conventional silicates, in the form of fibres, flakes or granules, such as bentonite, nontronite, beidellite, volkonskoite, hectorite, saponite, sauconite, vermiculite, sericite, sepiolite, paligorskite also known as attapulgite, montmorillonite, alloysite and the like, possibly modified by acid treatment and/or derivatized, and mixtures thereof, more preferably silica. Examples of silica are pyrogenic silica, precipitated amorphous silica, wet silica (hydrated silicic acid), or mixtures thereof.

Preferably the white reinforcing filler has a specific surface area (BET) of at least 30 m$^2$/g, more preferably at least 50 m$^2$/g, and even more preferably at least 80 m$^2$/g.

Preferably the white reinforcing filler has a specific surface area (BET) of less than 400 m$^2$/g, more preferably equal to or lower than 250 m$^2$/g, and even more preferably equal to or lower than 220 m$^2$/g.

Advantageously, the white reinforcing filler has a specific surface area (BET) of from about 50 m$^2$/g to about 350 m$^2$/g, more preferably from about 70 m$^2$/g to about 240 m$^2$/g, even more preferably from about 90 m$^2$/g to about 190 m$^2$/g.

Examples of suitable commercial silica are products sold under the Hi-Sil® brand of PPG Industries (Pittsburgh, Pa.), Ultrasil® by Degussa, or Zeosil® by Rhodia, such as precipitated silica Rhodia Zeosil MP1165 (BET specific surface area 160 m$^2$/g), Ultrasil VN3 GR (BET specific surface area 180 m$^2$/g) and Zeosil 1115 MP (BET specific surface area 95-120 m$^2$/g).

For some applications, the cross-linkable elastomeric composition may comprise, in addition to said white reinforcing filler, at least 1 phr, more preferably at least 2 phr, and even more preferably at least 3 or 4 phr of carbon black.

Carbon black can be selected from standard tyre grades, i.e. having a surface area of not less than 20 m$^2$/g, more preferably more than 50 m$^2$/g (measured according to ASTM D6556-16).

Commercial examples of carbon black are N375 or N234 marketed by Birla Group (India) or Cabot Corporation.

Optionally, the cross-linkable elastomeric composition may comprise one or more reinforcing fillers as defined above in the mixture.

According to one aspect of the present invention, the elastomeric composition comprises from about 5% to about 15% by weight, preferably from about 7% to about 12% by weight, with respect to the amount of white reinforcing filler of the silane mixture (b) comprising at least one sulfur-silane and at least one amino-silane.

The silane mixture (d) shall preferably comprise from 60% to 90% by weight with respect to the total quantity of mixture of at least one sulfur-silane, and 40% to 10% by weight with respect to the total quantity of mixture of at least one amino-silane.

According to a further preferred aspect, the silane mixture comprises from 70% to 90% by weight with respect to the total quantity of mixture of at least one sulfur-silane, and from 30% to 10% by weight with respect to the total quantity of mixture of at least one amino-silane.

According to one particularly preferred aspect, the silane mixture comprises from 80% to 90% by weight with respect to the total quantity of mixture of at least one sulfur-silane, and from 20% to 10% by weight with respect to the total quantity of mixture of at least one amino-silane.

According to one preferred aspect, the silane mixture comprises at least one amino-silane represented by the following formula (I):

$$(R)_3Si—C_nH_{2n}—[X—C_mH_{2m}]_p—Y \tag{I}$$

where

R groups, equal or different each other, are selected from alkyl or alkoxy groups having 1 to 4 carbon atoms, provided that at least one of the R groups is an alkoxy group;

n and m, equal or different each other, are an integer from 1 to 6 inclusive;

p is an integer from 0 to 5 inclusive;

X is a group —NH—, and

Y is a group —NH$_2$ o NHR', where R' is an alkyl or cycloalkyl group from 1 to 6 carbon atoms.

According to one preferred aspect, the silane mixture comprises at least one sulfur-silane represented by the following formula (II):

$$(R)_3Si—C_nH_{2n}—X \qquad (II)$$

where

X is a mercapto group (—SH), or —(S)$_m$C$_n$H$_{2n}$—Si—(R)$_3$ the R groups, equal or different each other, are selected from alkyl or alkoxy groups having from 1 to 4 carbon atoms, provided that at least one of the R groups is an alkoxy group; and n and m, equal or different each other, are an integer from 1 to 6 inclusive.

Amino-silanes useful in the present invention represented by the formula (I) are 2-aminoethyl-trimethoxysilane, 2-aminoethyl-triethoxysilane, 2-aminoethyl-tripropoxysilane, 2-aminoethyl-tributoxysilane, 3-aminopropyl-trimethoxysilane, 3-aminopropyl-triethoxysilane (APTES), 3-aminopropyl-methyldiethoxysilane, 3-aminopropyl-methyldimethoxysilane, 3-aminopropyl-diisopropylethoxysilane, 3-aminopropyltris-(methoxyethoxyethoxy)silane, 3-aminopropyl-diisopropyletoxy silane, 3-(2-aminomethylamino) propyl-triethoxysilane, 3-(2-(2-aminoethylamino)ethyl-amino) propyl-trimethoxysilane, 4-aminobutyl-triethoxysilane, 4-aminobuthyldimethyl-methoxysilane, 4-aminobutyl-triethoxysilane, N-(2-aminoethyl)aminomethyl-triethoxysilane, N-(2-aminoethyl)-3-aminopropyl-trimethoxysilane (also known as N-[3-(trimethoxysilyl)propyl]ethylenediamine (EDTMS)), N-(2-aminoethyl)-3-aminopropyl-triethoxysilane, N-(2-aminoethyl)-3-aminopropyl-tris(2-ethylhoxy) silane, N-(2-aminoethyl)-3-aminopropyl-methyldimethoxysilane, N-(2-aminoethyl)-3-aminopropyl-methyldiethoxysilane, N-(2-aminoethyl)-3-aminoisobutyl-methyldimethoxysilane, N-(6-aminohexyl)-3-aminopropyl-trimethoxysilane, N-(6-aminohexyl)-3-aminopropyl-triethoxysilane, N-2-(vinylbenzylamino)-ethyl-3-aminopropyl-trimethoxysilane, N-cyclohexyl (aminomethyl)methyldiethoxysilane, N-cyclohexyl (aminomethyl)triethoxysilane, N-cyclohexyl(aminomethyl) trimethoxy silane, N-cicloesyl-3-amminopropyl-trimethoxysilane, N-(n-butyl)-3-aminopropyl-trimethoxysilane, N-(n-butyl)-3-aminopropyl-triethoxysilane, N-(n-butyl)-aminomethyl-triethoxysilane, N, N-diethylaminopropyltrimethoxysilane, N, N-dimethyl-aminopropyltrimethoxysilane, N,N-diethylaminomethyltriethoxysilane.

Sulphosilanes useful in the present invention represented by the formula (II) are bis[3-(trimethoxysilyl)propyl]-tetrasulphane (TESPT), bis[3-(triethoxysilyl)propyl]-disulphane (TESPD), bis[2-(trimethoxysilyl)ethyl]-tetrasulphane, bis [2-(triethoxysilyl)ethyl]-risulphane, bis[3-(trimethoxysilyl) propyl]-disulphane, (1-mercaptomethyl)triethoxysilane, (2-mercaptoethyl)triethoxysilane, (3-mercaptopropyl)triethoxysilane, (3-mercaptopropyl)methyldiethoxysilane, (3-mercaptopropyl)methyldimethoxysilane, (3-mercaptopropyl)trimethoxysilane, 3-octanoylthio-1-propyltriethoxysilane and (2-mercaptoethyl)tripropoxysilane.

Preferred compounds represented by the formula (I) and (II) are (i) amino-silanes selected from the group consisting of (3-aminopropyl)triethoxysilane (APTES), (3-aminopropyl)trimethoxysilane, N-(2-aminoethyl)-3-aminopropyl trimethoxysilane (also known as N-[3-(trimethoxysilyl)propyl]ethylenediamine (EDTMS)), and N-(2-amino-ethyl)-3-aminopropyl triethoxysilane, and (ii) sulfo-silanes selected from the group consisting of bis[3-(trimethoxysilyl)propyl]-tetrasulphane (TESPT), bis[3-(triethoxysilyl)propyl]-disulphane (TESPD), and (3-mercaptopropyl)trimethoxy silane.

The cross-linkable elastomeric composition shown above can be vulcanised according to known techniques, in particular with sulfur-based vulcanisation systems commonly used for elastomeric polymers. To this end, in the elastomeric composition, after one or more thermomechanical processing steps, a sulfur-based vulcanization agent is incorporated together with vulcanization accelerators. In the final processing step, the temperature is generally kept below 120° C. and preferably below 100° C., in order to avoid any undesired pre-curing phenomenon.

The vulcanising agent is preferably selected from sulfur, or alternatively, sulfur-containing molecules (sulfur donors) such as, for example, caprolactam disulphide (OLD), bis [(trialkoxysilyl)propyl]polysulphides, dithiophosphates, phosphoryl polysulphide (SDT) and mixtures thereof.

Preferably the vulcanizing agent is sulfur, preferably selected between soluble sulfur (crystalline sulfur), insoluble sulfur (polymeric sulfur) and sulfur dispersed in oil and mixtures thereof.

Commercial examples of suitable curing agents are 65% sulfur known under the trade name of Rhenogran from Lanxess, 67% sulfur known under the trade name of Crystex OT33 from Eastman, 95% sulfur known under the trade name of SchwefelKC from Solvay, rhombic crystalline sulfur known under the trade name of Sulphur (1% oil and 0.3% silica) from Zolfindustria, The vulcanizing agent can be present in the vulcanizing elastomeric composition in a total quantity generally from 0.1 to 15 phr, preferably from 0.5 to 10 phr, even more preferably from 1 to 7 phr.

The cross-linkable elastomeric composition may comprise one or more vulcanising agents as defined above in a mixture.

The vulcanising agent is preferably used in combination with adjuvants such as activators, vulcanization accelerators and/or retardants known to men skilled in the art.

Activators that are particularly effective are zinc compounds, and in particular ZnO, ZnCO$_3$, zinc salts of saturated or unsaturated fatty acids containing 8 to 18 carbon atoms such as zinc stearate, which are preferably formed in situ in the elastomeric composition from ZnO and fatty acid, and also BiO, PbO, Pb$_3$O$_4$, PbO$_2$ or mixtures thereof.

The accelerating agent for vulcanization is preferably selected from dithiocarbamates, guanidines, thioureas, thiazoles, sulphenamides, sulphenimides, thiurams, amines, xanthates and mixtures thereof.

Preferably the accelerating agent is selected from N-cyclohexyl-2-benzothiazol-sulfenamide (CBS), N-tert-butyl-2-benothiazol-sulfenamide (TBBS) and mixtures thereof.

A commercial example of a suitable accelerating agent is N-cyclohexyl-2-benzothiazyl-sulfenamide Vulkacit® (CBS or CZ) marketed by Lanxess.

The accelerating agent may be present in the cross-linkable elastomeric composition in a total quantity generally ranging from 0.05 phr to 10 phr, preferably from 0.1 phr to 5 phr.

The cross-linkable elastomeric composition may comprise one or more accelerating agents as defined above in a mixture.

The vulcanisation retarding agent can be selected for example from urea, phthalic anhydride, N-nitrosodiphenylamine N-cyclohexyethylthiophthalimide (CTP or PVI), and mixtures thereof.

A commercial example of a suitable retardant agent is N-cyclohexyethylthiophthalimide VULKALENT G from Lanxess.

The retardant agent may be present in the cross-linkable elastomeric composition in a quantity generally ranging from 0.05 phr to 2 phr.

The cross-linkable elastomeric composition may comprise one or more retardant agents as defined above in a mixture.

The cross-linkable elastomeric composition may comprise other commonly used additives selected on the basis of the specific application for which the elastomeric composition is designed. For example, the following may be added to said cross-linkable elastomeric composition: antioxidants, anti-aging agents, plasticizers, adhesives, anti-ozonants (in particular p-phenylenediamine), waxes, modified resins, fibres (e.g. Kevlar® paste), or mixtures thereof.

The antioxidant may be selected from the group comprising phenylenediamine, diphenylamine, dihydroquinoline, phenol, benzimidazole, hydroquinone and derivatives thereof, possibly in a mixture.

The antioxidant agent is preferably selected from N-isopropyl-N'-phenyl-p-phenylenediamine (IPPD), N-(1,3-dimethyl-butyl)-N'-phenyl-p-phenylenediamine (6PPD), N,N'-bis-(1,4-dimethyl-pentyl)-p-phenylenediamine (77PD), N,N'-bis-(1-ethyl-3-methylpentyl)-p-phenylenediamine (DOPD), N,N'-Bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-Bis(1-methylheptyl)-p-phenylenediamine, N,N'-Di-sec-butyl-p-phenylene diamine (44PD), N-phenyl-N'-cyclohexyl-p-phenylenediamine, N-phenyl-N'-1-methyl-p-phenylenediamine and the like, and mixtures thereof, preferably is N-(1,3-dimethyl-butyl)-N'-phenyl-p-phenylenediamine (6-PPD).

A commercial example of a suitable antioxidant agent is 6PPD from Solutia/Eastman's.

The antioxidant agent may be present in the cross-linkable elastomeric composition in a total quantity generally ranging from 0 phr to 20 phr, preferably from 0.5 phr to 10 phr.

The wax can for example be an oil wax or a paraffin mixture.

Commercial examples of suitable waxes are Repsol N-paraffins blend and Rhein Chemie's Antilux® 654 microcrystalline wax.

Wax may be present in the cross-linkable elastomeric composition in a total quantity generally ranging from 0 phr to 20 phr, preferably from 0.5 phr to 5 phr.

In order to further improve processability, at least one plasticising agent generally selected from mineral oils, vegetable oils, synthetic oils, low molecular weight polymers and mixtures thereof, such as aromatic oil, naphthenic oil, phthalates, soya oil and mixtures thereof, may be added to the cross-linkable elastomeric composition. The amount of plasticiser is generally ranging from 0 phr to 70 phr, preferably from 5 phr to 30 phr.

The cross-linkable elastomeric composition referred to above may be prepared by mixing together (a) at least one non-functionalised elastomeric polymer, (b) at least one functionalised elastomeric polymer, (c) at least one white reinforcing filler and (d) the mixture comprising at least one sulphosilane and at least one amino-silane, with the other optionally present additives, in accordance with techniques known in the art. The mixing steps can be carried out, for example, by using an open mixer of the open mixer type, or an internal mixer of the tangential rotor type (Banbury®) or with interlocking rotors (Intermix®), or in continuous mixers of the Ko-Kneader™ type (Buss®), or of the co-rotating or counter-rotating double helix type.

The tyre according to the present invention can be manufactured according to a process that comprises:

building components of a green tyre on at least one forming drum;

shaping, moulding and vulcanizing the tyre;

wherein building at least one of the green tyre components comprises:

manufacturing at least one green component comprising the cross-linkable elastomeric composition of the invention.

DESCRIPTION OF THE DRAWINGS

The description will be shown hereinbelow with reference to the drawings, provided for indicative purposes only and, therefore, not limitative, wherein.

The present description refers by way of example to a vehicle wheel tyre. The Applicant considers that the present invention may also apply to tyres for different vehicles such as heavy vehicles, motorcycles, bicycles.

Figure 1:
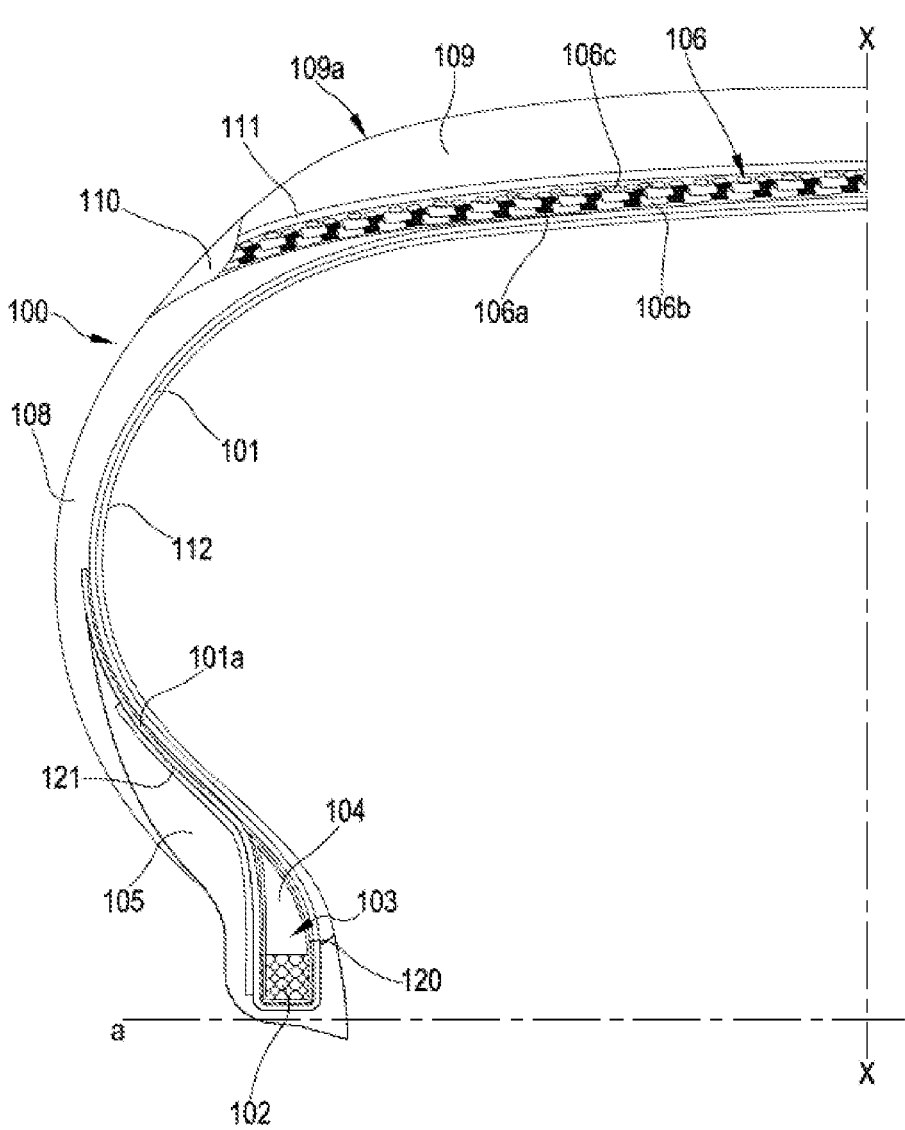
FIG. 1 illustrates in transverse half-section a tyre for car wheels according to a first embodiment of the present invention.

In FIG. 1, "a" indicates an axial direction and "x" indicates a radial direction. For simplicity, FIG. 1 shows only a portion of the tyre, the remaining portion not represented being identical and symmetrically arranged with respect to the radial direction "x".

With reference to FIG. 1, tyre 100 for vehicle wheels comprises at least one carcass structure of elastomeric blend, comprising at least one carcass layer 101 with opposite end flaps engaged with their respective annular anchoring structures 102, referred to as bead core, possibly associated with an bead filler 104 of elastomeric blend. The area of the tyre comprising the bead 102 and the 104 filler forms an annular reinforcing structure 103, the so-called bead, intended to anchor the tyre on a corresponding mounting rim, not shown.

The carcass structure is usually of radial type, i.e. the reinforcing elements of at least one carcass layer 101 are located on planes comprising the rotational axis of the tyre and substantially perpendicular to the equatorial plane of the tyre. Said reinforcing elements generally consist of textile cords, e.g. rayon, nylon, polyester (e.g. polyethylene naphthalate (PEN)). Each annular reinforcing structure is associated with the carcass structure by folding back the opposite side edges of at least one carcass layer 101 around the annular anchorage structure 102 to form so-called carcass flaps 101a as shown in FIG. 1.

In one embodiment, the coupling between carcass structure and annular reinforcing structure can be provided by means of a second carcass layer (not shown in FIG. 1) applied in an axially outer positon relative to the first carcass layer.

An anti-abrasive strip 105 made of elastomeric blend is placed in an outer position of each annular reinforcing structure 103. Preferably each anti-abrasive strip 105 is placed at least in axially outer position relative to the annular reinforcing structure 103 and extends at least between side-wall 108 and the radially lower portion of the annular reinforcing structure 103.

Preferably, the anti-abrasive strip 105 is arranged so as to wrap around the annular reinforcing structure 103 along the inner and outer axially and radially lower areas of the annular reinforcing structure 103 so as to interpose itself between the latter and the wheel rim when the tyre 100 is mounted on the rim.

The carcass structure is associated with an belt structure 106 of elastomeric blend comprising one or more belt layers 106a, 106b placed in radial overlap with respect to each other and relative to the carcass layer, having typically metal reinforcing cords. Such reinforcing cords may have a cross orientation relative to a direction of circumferential development of the tyre 100. By "circumferential" direction it is meant a direction generally facing in the direction of rotation of the tyre.

In a radially more external position to the belt layers 106a,106b at least one zero degrees reinforcing layer 106c, commonly known as "belt 0°", can be applied, which generally incorporates a plurality of reinforcing cords, typically textile cords, oriented in a substantially circumferential direction, thus forming an angle of a few degrees (for example an angle between approximately 0° and 6°) relative to the equatorial plane of the tyre, and coated with an elastomeric blend.

A tread band 109 of elastomeric blend is applied in a radially outer position relative to the belt structure 106.

On the lateral surfaces of the carcass structure, each extending from one of the lateral edges of the tread 109 to the respective annular reinforcing structure 103, respective sidewalls 108 of elastomeric blend are also applied in an axially outer position.

In a radially outer position, the tread band 109 has a rolling surface 109a that is intended to come in contact with the ground. Circumferential grooves, which are connected by transverse notches (not shown in FIG. 1) so as to define a plurality of blocks of various shapes and sizes distributed over the rolling surface 109a, are generally made in this surface 109a, which for simplicity is represented smoothly in FIG. 1.

An underlayer 111 of elastomeric blend is placed between the belt structure 106 and the tread band 109.

A strip made of elastomeric material 110, commonly known as "mini-sidewall", may be present in the connection area between the 108 sidewalls and the 109 tread band, this mini-sidewall being generally obtained by co-extrusion with the tread band 109 and allowing an improvement in the mechanical interaction between the tread band 109 and the sidewalls 108. Preferably, the end portion of the sidewall 108 directly covers the lateral edge of the tread band 109.

In the case of tubeless tyres, a layer of elastomeric material 112, generally known as "liner", which provides the necessary air-tightness to the inflation air of the tyre, may also be provided in a radially internal position relative to the carcass layer 101.

The stiffness of the tyre sidewall 108 can be improved by providing the bead structure 103 with a reinforcing layer 120 generally known as "flipper" or additional list-shaped insert. Flipper 120 typically comprises a plurality of textile cords embedded within a layer of elastomeric material.

Flipper 120 is a reinforcing layer which is wrapped around the respective bead 102 and the bead filler 104 in such a way as to surround them at least partially, this reinforcing layer being placed between the at least one carcass layer 101 and the bead structure 103. Usually, the flipper is in contact with said at least one layer of carcass 101 and the bead structure 103.

The tyre bead structure 103 may comprise an additional protective layer which is generally known as "chafer" 121 or protective strip and which has the function of increasing stiffness and integrity of the tyre bead structure 103.

Chafer 121 usually comprises a plurality of cords embedded within a layer of elastomeric material. Such cords are generally made of textile materials (e.g. aramid or rayon) or metal materials (e.g. steel cord).

The elastomeric composition according to the present invention can be advantageously used to make the elastomeric material incorporated in one or more of the components of the tyre selected from tread band, tread underlayer, sidewall, and in general any structural element in which silica is used as a reinforcing element, preferably in the tread, even when made of two radially overlapping layers (known as "cap and base" tread) with a radially outer portion ("cap") and a radially inner portion ("base") comprising different amounts of silica.

The use of the elastomeric composition to make the elastomeric material of the above mentioned components allows to obtain a tyre with a lower rolling resistance, and consequently a lower heat development and fuel consumption, at the same time realizing a good resistance to tearing of the tyre surface, and a good maneuverability during its use.

The building of tyres 100 as described above may be carried out by assembly of the respective semi-finished products on a forming drum, not illustrated, by at least one assembly device.

At least part of the components intended to form the carcass structure of the tyre may be constructed and/or assembled on the forming drum. More particularly, the forming drum is suitable for first receiving the liner, if any, and then the carcass structure and the anti-abrasive strip. Subsequently, devices not shown shall coaxially engage one of the annular anchoring structures around each of the end flaps, place an outer sleeve comprising the belt structure and tread band in a coaxially centred position around the cylindrical carcass sleeve and conform the carcass sleeve to a substantially toroidal configuration by radial expansion of the carcass structure, so as to determine its application against a radially internal surface of the outer sleeve.

After the building of the green tyre, a moulding and vulcanization treatment is carried out in order to determine the structural stabilization of the tyre by cross-linking the elastomeric compositions as well as to impress on the tread band a desired tread pattern and to imprint any distinctive graphic marks on the sidewalls.

According to an embodiment not illustrated, the tyre can be a tyre for wheels of heavy transport vehicles, such as trucks, buses, trailers, vans, and in general for vehicles where the tyre is subjected to a high load. Preferably, such a tyre is suitable for mounting on rims with a diameter of 17.5 inches or more for directional or trailer wheels.

According to an embodiment not showed, the tyre can be a motorcycle wheel tyre which is typically a tyre with a straight cross-section characterised by a high transverse curvature.

According to an embodiment not showed, the tyre can be a tyre for bicycle wheel.

The following is a description of some preparatory examples according to the invention and comparative examples, provided for illustrative purposes only and not limiting the scope of protection of the present invention.

EXPERIMENTAL PART

Methods of Analysis

The scorch time represents the time needed to increase the Mooney viscosity by 5 points. The value in minutes was measured at 127° C. according to ISO 289/2 (1994).

Mooney ML(1+4) viscosity at 100° C. was measured according to ISO 289-1:1994 on non-crosslinked elastomeric compositions.

IRHD hardness was measured at 23° C. on cross-linked elastomeric compositions according to ISO 48:2007.

MDR rheometric analysis (according to ISO 6502): an Alpha Technologies type MDR2000 rheometer was used. The tests were carried out at 170° C. for 30 minutes, at an oscillation frequency of 1.66 Hz (100 oscillations per minute) and an oscillation amplitude of ±0.5°, measuring the minimum torque value (ML), maximum torque value (MH), the time required to increase the torque by two units (TS2), and the time required to reach different percentages (30, 60 and 90%) of the maximum torque value (MH).

The percentage of silanisation is the percentage ratio between silane reacted with silica and the total amount of silane available. The evaluation of unreacted silane was carried out after the first mixing step. Unreacted silane is removed by solvent dissolution. The resulting solution is chemically analysed to identify the Si—C bond concentration. The amount of Si—C bond found in the solution is proportional to the amount of unreacted silane. The percentage of silanisation is calculated from the ratio of the concentration of unreacted silane to the initial silane concentration in the recipe.

Properties of Vulcanized Materials

The elastomeric materials prepared in the subsequent examples have been vulcanized to give specimens on which analytical characterizations and evaluation of dynamic mechanical properties have been performed. The vulcanisation, unless otherwise indicated, was carried out in the mould, in a hydraulic press at 170° C. and at a pressure of 200 bar for a time of about 10 minutes.

Static modules: the static mechanical properties were measured at 23° C. according to ISO 37:2005. In particular, tensile stresses at various levels of elongation (100% and 300%, named in the order CA1 and CA3), load and elongation at break (CR, AR respectively) were measured on ring shaped samples of vulcanized elastomeric compositions.

Dynamic Modules: Dynamic mechanical properties were measured using an Instron dynamic device in compression and tension operation using the following method. A sample of the vulcanized elastomeric compositions of cylindrical shape (height=25 mm; diameter=14 mm), compression pre-load up to 25% longitudinal deformation with respect to the initial length and maintained at the preset temperature (of −10° C., 23° C. or 70° C.) during the test, was subjected to a dynamic sinusoidal tension of amplitude ±3.5% with respect to the preload length, at a frequency of 100 Hz.

The dynamic mechanical properties are expressed in terms of dynamic elastic modulus values (E') and Tan delta (loss factor). The Tan delta value has been calculated as the ratio between the viscous dynamic modulus (E") and the dynamic elastic modulus (E').

DIN abrasion is the amount of compound removed by operating under the standard conditions provided in DIN 53516 or ISO4649.

The peeling test was performed by measuring the force (N) of detachment between two samples of the same composition co-vulcanized to create an interface region. The test is related to the tear resistance of the finished product. The detachment test was also performed after subjecting the samples to a thermo-oxidative ageing process in the stove at 70° C. for 48 hours.

Example 1

The elastomeric materials shown in Table 1 below have been prepared in the following way (the quantities of the various components are indicated in phr).

In the first step the elastomeric components, the white reinforcing filler and the silanes were mixed in an internal mixer (model Pomini PL 1.6) for about 6 minutes up to about 135° C. In the second step zinc-based components and other protective agents were added, and mixing continued for about 4 minutes up to about 135° C. Finally, sulfur and accelerator (TBBS) were added, mixing for a further 2 minutes up to about 95° C., then the elastomeric composition was discharged.

TABLE 1

| | COMPOSITION | | |
| INGREDIENTS | R1 | A1 | A2 |
|---|---|---|---|
| NR | 15.00 | 15.00 | 15.00 |
| BR | 28.00 | 28.00 | 28.00 |
| SSBR | 57.00 | 57.00 | 57.00 |
| Silica | 74.00 | 74.00 | 74.00 |
| NC | 3.00 | 3.00 | 3.00 |
| TESPT | 5.2 | 3.4 | 3.4 |
| AMEO | — | 1.7 | 1.7 |
| Oil | 15.0 | 15.0 | 15.0 |
| Resin | 9.0 | 9.0 | 9.0 |
| Stearic Acid | 1.0 | 1.0 | 1.0 |
| Wax | 2.0 | 2.0 | 2.0 |
| ZnO | — | — | 2.5 |
| Zinc Octoate | 3.0 | 3.0 | — |
| TMQ | 2.00 | 2.00 | 2.00 |
| 6PPD | 3.00 | 3.00 | 3.00 |

TABLE 1-continued

| INGREDIENTS | COMPOSITION | | |
|---|---|---|---|
| | R1 | A1 | A2 |
| TBBS | 2.50 | 2.50 | 2.50 |
| Sulfur | 0.80 | 0.80 | 0.80 |

NR: Natural Rubber - SIR 20 - Indonesia Rubber Standard
BR: Standard Polybutadiene (High Cis 97%) - SKD NHEODYMIUM -
(Nizhnekamskneftekhim Export)
SSBR: Styrene butadiene functionalized copolymer - microstructure with styrene 21% and vinyl 62.5% on the butadiene fraction - SPRINTAN ™ SLR 3402 - Trinseo
Silica: Highly dispersible silica with surface area 175 m²/g - Zeosil ® 1165 MP - Solvay industries
NC: Carbon Black - Vulcan ® 7H - Cabot
TESPT: bis[3-(triethoxysilyl)propyl]tetrasulfide - SI69 ® - Evonik
AMEO: 3-aminopropyl triethoxysilane - Dynasylan ® AMEO - Evonik
Wax: RIOWAX BM-01 - Ser SpA
Oil: TDAE - NYTEX 4700 - Nytex
Resin: Impera ™ P1504 - Eastman
TMQ: 2,2,4-trimethyl-1,2-dihydroquinoline - Vulkanox ® HS/LG - Lanxess
6PPD: N-(1,3-dimethylbutyl)-N'-phenylphenylenediamine - Santoflex ® 6PPD - Eastman
TBBS: N-tertbutyl-2-benzothiazil sulfenamide - Vulkacit ® NZ - Lanxess
Sulphur: Sulfur 98.50% (1% oil) - Zolfindustria The elastomeric compositions thus prepared were evaluated for their vulcanisation behaviour (170° C., 30 min.) and subsequently, in terms of static and dynamic mechanical properties and wear resistance according to the methods described above. The following Table 2 shows the rheometric, mechanical, dynamic and static properties of the compositions in Table 1.

TABLE 2

| | R1 | A1 | A2 |
|---|---|---|---|
| Rheometric characteristics | | | |
| Scorch 127° C. [min] | 32.1 | 22.8 | 20.0 |
| Mooney ML(1 + 4) 100° C. | 68.3 | 80.2 | 88.4 |
| ML [dN m]      30 min | 3.24 | 3.20 | 3.70 |
| MH [dN m]      170° C. | 27.18 | 25.31 | 26.35 |
| TS2 [min] | 0.95 | 1.03 | 0.96 |
| T30 [min] | 2.26 | 1.85 | 1.75 |
| T60 [min] | 3.11 | 2.53 | 2.50 |
| T90 [min] | 4.41 | 3.94 | 3.92 |
| Silanisation [% w/w] | 92.3 | 99.4 | 99.5 |
| Static mechanical characteristics | | | |
| Density [g/cm³] | 1.174 | 1.172 | 1.180 |
| Ca1 [MPa] | 2.44 | 2.26 | 2.38 |
| Ca3 [MPa] | 9.79 | 10.29 | 10.93 |
| CR [MPa] | 14.4 | 16.0 | 14.7 |
| AR [%] | 429 | 434 | 397 |
| IRHD hardness 23° C. | 75.0 | 71.2 | 72.7 |
| Dynamic mechanical characteristics | | | |
| E' 100 Hz [MPa] | | | |
| −10° C. | 16.59 | 13.42 | 13.17 |
| +23° C. | 10.39 | 8.48 | 8.49 |
| +70° C. | 7.95 | 6.78 | 6.84 |
| Tanδ 100 Hz | | | |
| −10° C. | 0.580 | 0.592 | 0.588 |
| +23° C. | 0.258 | 0.239 | 0.232 |
| +70° C. | 0.138 | 0.132 | 0.128 |
| Wear resistance | | | |
| Abrasion [mm³] | 64.6 | 71.2 | 62.3 |
| Detachment [N] | 71.4 | 77.8 | 82.5 |
| Detachment after ageing [N] | 65.5 | 76.9 | 71.5 |
| Detachment/Ca3 | 7.3 | 7.6 | 7.5 |
| Detachment after ageing/Ca3 | 5.5 | 10.0 | 5.6 |

The elastomeric composition A1 of the invention showed a higher Mooney viscosity and reduced scorch time. The high Mooney viscosity value shown by the elastomeric composition A2 of the invention is due to the presence of zinc oxide which is not able to plasticize the elastomeric composition such as zinc octoate.

Figure 2:
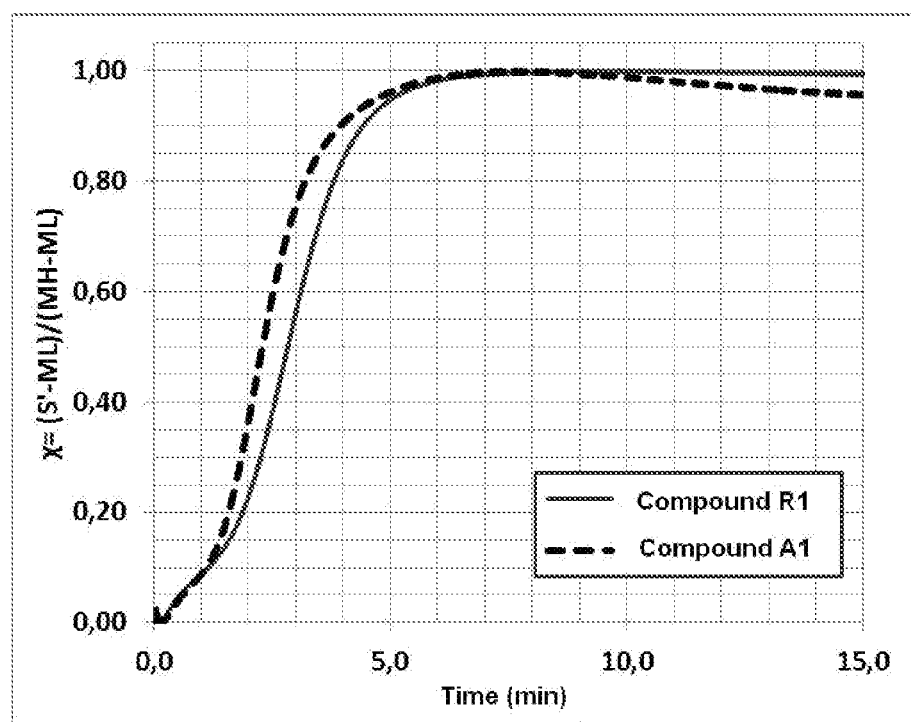
FIG. 2 shows a Cartesian graph of the vulcanisation curves of the R1 and A1 elastomeric compounds described in Example 1.

The kinetics of the composition is influenced by the combination of the two silanes, and this effect can be seen in the vulcanization curves in FIG. 2, where it is observed that the composition A1 of the invention has a faster kinetics than the composition R1. In addition, the vulcanization curve of the composition A1 of the invention showed the phenomenon of reversion, an uncommon behaviour for tread compounds.

Finally, a level of silanisation close to 100% was observed for both the compositions A1 and A2 of the invention.

The compositions A1 and A2 of the invention also show better dynamic mechanical properties than the composition R1 with lower hysteresis values at 23° C. and 70° C., predicting reduced rolling resistance.

In addition, the static mechanical properties of the compositions A1 and A2 of the invention are better or equivalent to those of the composition R1, with a marked improvement in the results of detachment tests both on the fresh product and after ageing, predicting greater resistance to tearing.

Example 2

The elastomeric materials shown in Table 3 below have been prepared in the following way (the quantities of the various components are indicated in phr).

In the first step the elastomeric components, the white reinforcing filler and the silanes were mixed in an internal mixer (model Pomini PL 1.6) for about 6 minutes up to about 135° C. In the second step zinc-based components and other protective agents were added, mixing continued for about 4 minutes up to about 135° C. Finally sulfur and accelerator (CBS) were added, mixing for a further 2 minutes up to about 95° C., then the elastomeric composition was discharged.

TABLE 3

| INGREDIENTS | COMPOSITION | | | |
|---|---|---|---|---|
| | R2 | A3 | A4 | A5 |
| NR | 60.00 | 60.00 | 60.00 | 60.00 |
| SSBR1 | 40.00 | 40.00 | 40.00 | 40.00 |
| Silica | 82.00 | 82.00 | 82.00 | 82.00 |
| NC | 3.50 | 3.50 | 3.50 | 3.50 |
| TESPT | 6.6 | 5.8 | 5.1 | 4.4 |
| AMEO | — | 0.7 | 1.5 | 2.2 |
| TESPT/AMEO % ratio | — | 89/11 | 78/22 | 67/33 |
| Stearic acid | 1.70 | 1.70 | 1.70 | 1.70 |
| Wax | 1.70 | 1.70 | 1.70 | 1.70 |
| Oil | 14.0 | 14.0 | 14.0 | 14.0 |
| Resin | 14.0 | 14.0 | 14.0 | 14.0 |
| ZnO | 2.00 | 2.00 | 2.00 | 2.00 |
| TMQ | 1.70 | 1.70 | 1.70 | 1.70 |
| 6PPD | 3.30 | 3.30 | 3.30 | 3.30 |

TABLE 3-continued

| INGREDIENTS | COMPOSITION | | | |
|---|---|---|---|---|
| | R2 | A3 | A4 | A5 |
| CBS | 3.00 | 3.00 | 3.00 | 3.00 |
| Sulfur | 1.25 | 1.25 | 1.25 | 1.25 |

NR: Natural Rubber - SIR 20 - Indonesia Rubber Standard

SSBR1: Functionalized styrene butadiene copolymer - microstructure with styrene 21% and vinyl 62.5% on the butadiene fraction - SPRINTAN ™ SLR 3402 - Trinseo Silica: Highly dispersible silica with surface area 175 m2/g - Zeosil ® 1165 MP - Solvay Industries NC: Carbon Black - Vulcan ® 7H - CABOT TESPT: bis[3-(triethoxysilyl)propyl]tetrasulfide - SI69 ® - Evonik AMEO: 3-aminopropyl triethoxysilane - Dynasylan ® AMEO - Evonik Wax: RIOWAX BM-01 - SER Oil: TDAE - NYTEX 4700 - Nynas Resin: Impera ™ P1504 - Eastman TMQ: 2,2,4-trimethyl-1,2-dihydroquinoline - Vulkanox ® HS/LG - Lanxess 6PPD: N-(1,3-dimethylbutyl)-N'-phenylphenylenediamine - Santoflex ® 6PPD - Eastman CBS: N-cyclohexyl-2-benzothiazyl sulfonamide - Vulkacit ® CZ/EG-C - Lanxess Sulphur: Sulfur 98.50% (1% oil) - Zolfindustria The elastomeric compositions thus prepared were evaluated for their vulcanisation behaviour (170° C., 30 min.) and subsequently, in terms of static and dynamic mechanical properties and wear resistance according to the methods described above. The following table 4 shows the rheometric, mechanical, dynamic and static properties of the compositions in table 3.

TABLE 4

| | R2 | A3 | A4 | A5 |
|---|---|---|---|---|
| Rheometric characteristics | | | | |
| Scorch 127° C. | 20.7 | 19.0 | 14.7 | 11.5 |
| Mooney ML(1 + 4) 100° C. | 80.9 | 86.2 | 100.6 | 112.1 |
| ML [dN m] 30 min | 4.53 | 4.21 | 4.31 | 4.17 |
| MH [dN m] 170° C. | 28.66 | 25.15 | 23.84 | 23.53 |
| TS2 [min] | 0.77 | 0.82 | 0.72 | 0.52 |
| T30 [min] | 1.39 | 1.31 | 1.13 | 0.90 |
| T60 [min] | 1.71 | 1.56 | 1.34 | 1.08 |
| T90 [min] | 2.84 | 2.08 | 1.70 | 1.34 |
| Silanisation [% w/w] | 67.0 | 88.5 | 96.9 | 99 |
| Static mechanical characteristics | | | | |
| Density [g/cm³] | 1.195 | 1.193 | 1.194 | 1.193 |
| Ca1 [MPa] | 2.88 | 2.78 | 2.55 | 2.28 |
| Ca3 [MPa] | 12.16 | 11.74 | 11.59 | 10.70 |
| CR [MPa] | 17.66 | 18.01 | 18.19 | 18.42 |
| AR [%] | 436.09 | 459.20 | 454.81 | 476.46 |
| IRHD hardness 23° C. | 81.2 | 79.4 | 75.8 | 74.2 |
| Dynamic mechanical characteristics | | | | |
| E' 100 Hz [MPa] | | | | |
| −10° C. | 21.16 | 20.80 | 19.55 | 17.52 |
| +23° C. | 11.74 | 11.15 | 10.48 | 9.48 |
| +70° C. | 8.12 | 7.52 | 6.99 | 6.36 |
| Tanδ 100 Hz | | | | |
| −10° C. | 0.563 | 0.563 | 0.576 | 0.597 |
| +23° C. | 0.297 | 0.298 | 0.298 | 0.301 |
| +70° C. | 0.169 | 0.161 | 0.167 | 0.170 |
| Wear resistance | | | | |
| DIN abrasion [mm³] | 85.3 | 54.0 | 58.2 | 76.0 |
| Detachment [N] | 83.9 | 107.0 | 118.0 | 132.0 |
| Detachment after ageing [N] | 82.6 | 104.0 | 111.0 | 128.0 |

The introduction of increasing amounts of AMEO considerably affects both the kinetics of vulcanisation and the dynamic and static mechanical properties of the resulting elastomeric compositions.

Figure 3:
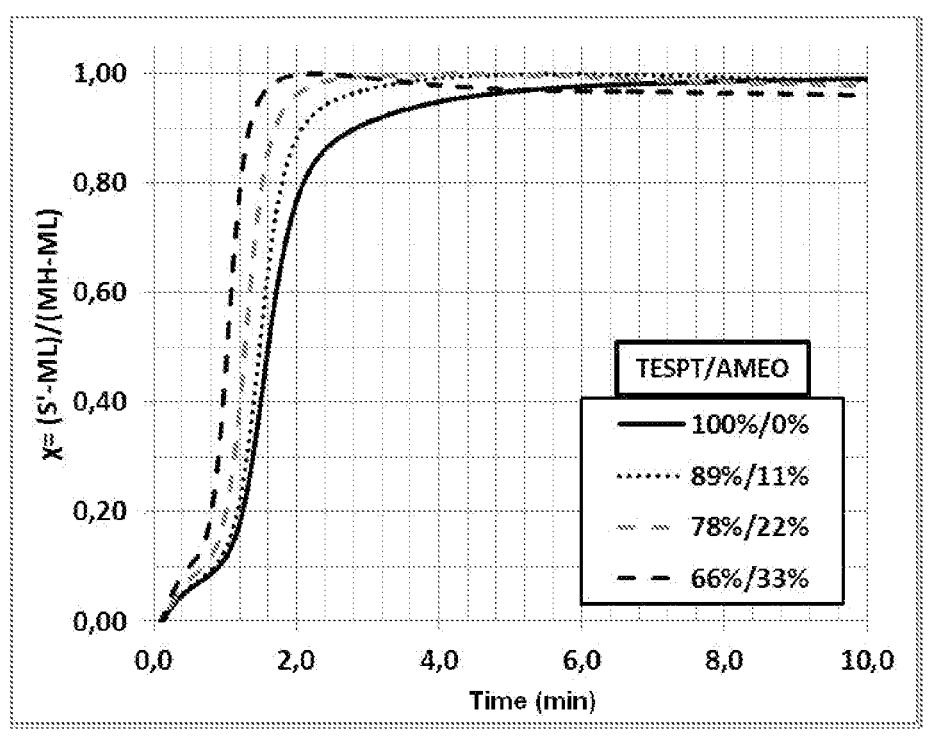
FIG. 3 shows a Cartesian graph of the vulcanisation curves of the elastomeric compounds R2 and A3-5 described in Example 2.
Figure 4:
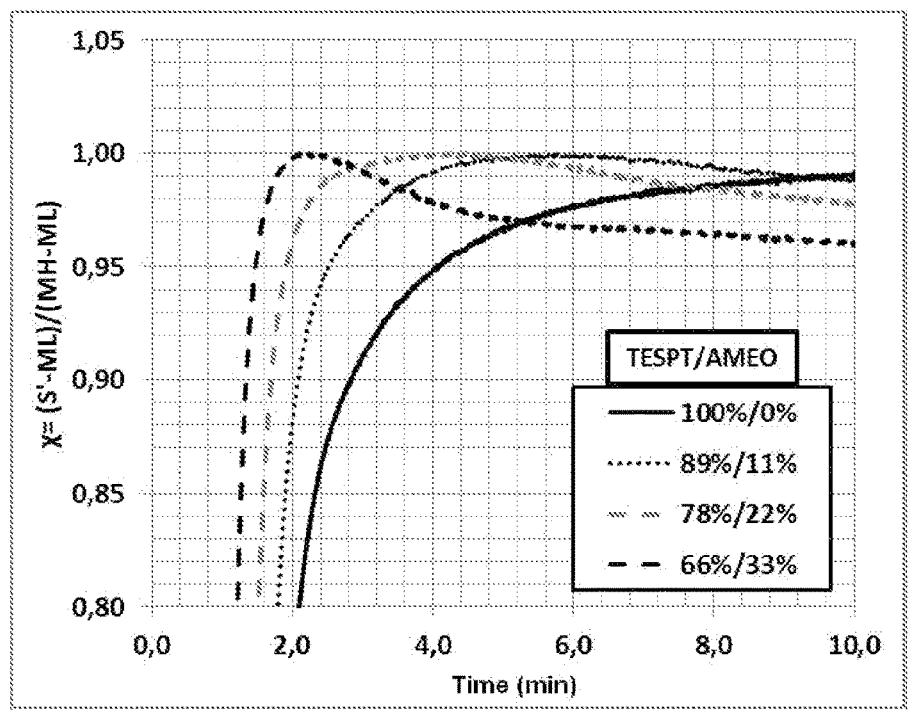
FIG. 4 shows a magnification of FIG. 3 in the range of values in ordinate axis of from 0.80 to 1.05.

The kinetics of the composition is influenced by the combination of the two silanes, and this effect can be seen in the vulcanization curves in FIG. 3, where it is clearly observed that the introduction of AMEO gradually led the vulcanization curve to show a more and more marked reversion phenomenon, and particularly evident in FIG. 4 which represents an amplified scale in the 0.8-1.05 tract of the y-axis in FIG. 3.

The vulcanisation curve of the reference composition R2 shows the classic behaviour of a tread composition comprising silica, with a progressively increasing and continuous trend.

The vulcanization curve of the composition A3 of the invention already shows a reduction in the values of T30, T60 and T90 with a trend that tends to flatten out to a constant maximum value.

The vulcanization curve of the composition A4 of the invention shows a further reduction in the values of T30, T60 and T90 with a trend tending towards reversion, i.e. a decrease from the maximum modulus values (MH). This behaviour can generate an external portion with a lower cross-linking density, resulting in lower stiffness and higher hysteresis, useful to improve tread grip on the road.

The vulcanization curve of the composition A5 of the invention accentuates the behaviour of the vulcanization curve A2, taking the reversion phenomenon to the extreme up to a value of 5% compared to the maximum value (MH).

Vulcanisation kinetics is also accelerated with the introduction of AMEO, as can be seen from the vulcanisation curve in FIG. 3 and the vulcanisation times (T30, T60 and T90) progressively reduced as the percentage of AMEO increases.

On the contrary, Mooney viscosity increased as the amount of AMEO increases, although the values obtained depend on the type of elastomeric composition.

The percentage of silanisation reaches almost 100% with a logarithmic trend as the percentage of AMEO increases. Also in this case, each elastomeric composition responds to the increase of AMEO with a slightly different behaviour, but always tending to a percentage of silanisation close to 100%.

As far as mechanical properties are concerned, it is noted that the elastomeric compositions A3-A5 of the invention compared to the reference composition R2 showed better values of load and elongation at break, a trend towards lower values of elastic modulus (E') and hardness, and better values of resistance to abrasion and detachment both on fresh samples and after ageing, maintaining hysteresis values at 23° C. and 70° C. substantially in line with the reference, and slightly higher at −10° C. (predictive of a better behaviour of the tyre on wet surfaces).

Example 3

The elastomeric materials shown in Table 5 below have been prepared in the following way (the quantities of the various components are indicated in phr).

In the first step the elastomeric components, the white reinforcing filler and the silanes were mixed in an internal mixer (model Pomini PL 1.6) for about 6 minutes up to about 135° C. In the second step zinc-based components and other protective agents were added, mixing continued for about 4 minutes up to about 135° C. Finally sulfur and accelerator (CBS) were added, mixing for a further 2 minutes up to about 95° C., then the elastomeric composition was discharged.

TABLE 5

| INGREDIENTS | COMPOSITION | | | |
|---|---|---|---|---|
| | R3 | A6 | A7 | A8 |
| NR | 15.00 | 15.00 | 15.00 | 15.00 |
| BR | 28.00 | 28.00 | 28.00 | 28.00 |
| SSBR1 | — | — | 14.00 | 43.00 |
| SSBR2 | 57.00 | 57.00 | 43.00 | 14.00 |
| Silica | 74.00 | 74.00 | 74.00 | 74.00 |
| TESPT | 5.25 | 3.50 | 3.50 | 3.50 |
| AMEO | — | 1.75 | 1.75 | 1.75 |
| TESPT/AMEO % ratio | — | 67/33 | 67/33 | 67/33 |
| Stearic acid | 1.20 | 1.20 | 1.20 | 1.20 |
| Zn Octoate | 1.20 | 1.20 | 1.20 | 1.20 |
| Wax | 1.80 | 1.80 | 1.80 | 1.80 |
| NC | 3.50 | 3.50 | 3.50 | 3.50 |
| Oil | 16.0 | 16.0 | 16.0 | 16.0 |
| Resin | 8.70 | 8.70 | 8.70 | 8.70 |
| ZnO | 2.00 | 2.00 | 2.00 | 2.00 |
| TMQ | 1.50 | 1.50 | 1.50 | 1.50 |
| 6PPD | 3.00 | 3.00 | 3.00 | 3.00 |
| CBS | 2.50 | 2.50 | 2.50 | 2.50 |
| Sulfur | 0.80 | 0.80 | 0.80 | 0.80 |

NR: Natural Rubber - SIR 20 - Indonesia Rubber Standard

SSBR1: Functionalized styrene butadiene copolymer - microstructure with styrene 21% and vinyl 62.5% on the butadiene fraction - SPRINTAN ™ SLR 3402 - Trinseo SSBR2: Non-functionalised styrene butadiene copolymer - microstructure with styrene 26% and vinyl 24% on the butadiene fraction - EUROPRENE SOL R C2525

BR: Standard Polybutadiene (High Cis 97%) - SKD NHEODYMIUM - (Nizhnekamsk-neftekhim Export)

Silica: Highly dispersible silica with surface area 175 m2/g - Zeosil ® 1165 MP - Solvay Industries NC: Carbon Black - Vulcan ® 7H - CABOT TESPT: bis[3-(triethoxysilyl)propyl]tetrasulfide - SI69 ® - Evonik AMEO: 3-aminopropyl triethoxysilane - Dynasylan ® AMEO - Evonik Wax: RIOWAX BM-01 - SER Oil: TDAE - NYTEX 4700 - Nynas Resin: Impera ™ P1504 - Eastman TMQ: 2,2,4-trimethyl-1,2-dihydroquinoline - Vulkanox ® HS/LG - Lanxess 6PPD: N-(1,3-dimethylbutyl)-N'-phenylphenylenediamine - Santoflex ® 6PPD - Eastman CBS: N-cyclohexyl-2-benzothiazyl sulfonamide - Vulcacit ® CZ/EG-C - Lanxess Sulphur: Sulfur 98.50% (1% oil) - Zolfindustria The elastomeric compositions thus prepared were evaluated for their vulcanisation behaviour (170° C., 30 min.) and subsequently, in terms of static and dynamic mechanical properties and wear resistance according to the methods described above. The following table 6 shows the rheometric, mechanical, dynamic and static properties of the compositions in table 5.

TABLE 6

| | R3 | A6 | A7 | A8 |
|---|---|---|---|---|
| Rheometric characteristics | | | | |
| Scorch 127° C. | 27.9 | 16.2 | 22.6 | 24.8 |
| Mooney ML(1 + 4) 100° C. | 62.4 | 83.7 | 75.5 | 74.7 |
| ML [dN m] 30 min | 3.14 | 4.13 | 3.01 | 3.24 |
| MH [dN m] 170° C. | 27.07 | 28.43 | 26.44 | 26.6 |
| TS2 [min] | 0.81 | 0.51 | 0.53 | 0.71 |
| T30 [min] | 2.11 | 1.72 | 1.81 | 1.91 |
| T60 [min] | 2.92 | 2.44 | 2.59 | 2.68 |
| T90 [min] | 4.24 | 3.57 | 3.78 | 3.89 |
| Silanisation [% w/w] | 96.8 | 99.4 | 99.1 | 99.2 |
| Static mechanical characteristics | | | | |
| Density [g/cm³] | 1.177 | 1.175 | 1.173 | 1.171 |
| Ca1 [MPa] | 2.29 | 2 | 2.22 | 2.16 |
| Ca3 [MPa] | 8.77 | 7.33 | 8.84 | 9.21 |
| CR [MPa] | 16.77 | 16.81 | 15.7 | 15.18 |
| AR [%] | 520.96 | 590.6 | 490.39 | 462.45 |
| IRHD hardness 23° C. | 1.177 | 1.175 | 1.173 | 1.171 |

TABLE 6-continued

| | R3 | A6 | A7 | A8 |
|---|---|---|---|---|
| Dynamic mechanical characteristics | | | | |
| E' 100 Hz [MPa] | | | | |
| −10° C. | 17.00 | 16.43 | 15.42 | 15.89 |
| +23° C. | 12.06 | 11.61 | 10.84 | 10.04 |
| +70° C. | 8.12 | 7.94 | 7.68 | 7.08 |
| Tanδ 100 Hz | | | | |
| −10° C. | 0.422 | 0.392 | 0.424 | 0.536 |
| +23° C. | 0.239 | 0.220 | 0.224 | 0.237 |
| +70° C. | 0.164 | 0.156 | 0.146 | 0.135 |
| Wear resistance | | | | |
| DIN abrasion [mm³] | 39.2 | 45.5 | 50.4 | 54.1 |
| Detachment [N] | 91.1 | 141 | 120 | 105 |
| Detachment/Ca3 | 10.39 | 19.24 | 13.57 | 11.40 |

Figure 5:
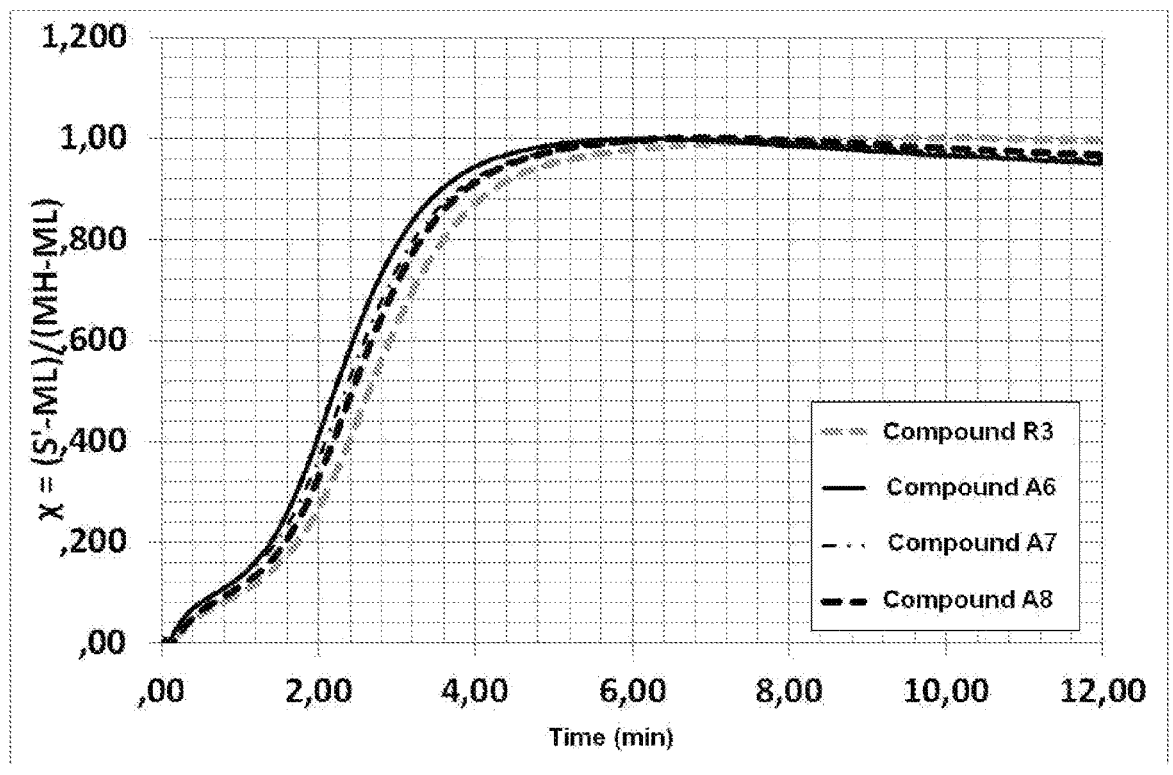
FIG. 5 shows a Cartesian graph of the vulcanisation curves of the elastomeric compounds R3 and A6-8 described in Example 3.

The results collected in Table 6, as also shown in FIG. 5, showed a very similar vulcanisation kinetics for all compositions A6-A8 and faster than the reference, with a reversionary trend, i.e. with a decrease from the maximum modulus values (MH), similarly to what observed for the composition A5 of example 2 with the same TESPT/AMEO ratio.

An increase in Mooney viscosity and an increase in the percentage of silanisation, which reaches almost 100%, was observed with the increase in the percentage of non-functionalised SBR confirming the observation of the previous examples that the values obtained are dependent on the type of elastomeric composition.

With regard to dynamic mechanical properties, lower values of Tan δ at 70° C. were observed for all compounds A6-A8 compared to the reference R3, predictive of lower rolling resistance and lower fuel consumption, and values of Tan δ at −10° C. which tend to increase as the percentage of functionalised SBR increases, predictive of greater tyre grip on wet surfaces.

The results of static mechanical properties showed a trend towards higher values at break and lower modulus values as the percentage of non-functionalized SBR increased, thus indicating a progression towards more rigid elastomeric compositions.

The invention claimed is:

1. A tyre comprising at least one structural element which includes a cross-linked elastomeric material prepared by vulcanisation of a cross-linkable elastomeric composition, wherein the cross-linkable composition comprises per 100 phr of vulcanisable polymer:

100 phr of vulcanisable polymer consisting of from 90 phr to 10 phr of at least one non-functionalised elastomeric polymer and from 10 phr to 90 phr of at least one functionalised elastomeric polymer;

from about 10 phr to about 120 phr of at least one white reinforcing filler;

from about 5% to about 15% by weight with respect to an amount of the at least one white reinforcing filler of a mixture of silanes, wherein the mixture comprises at least one sulfur-silane and at least one amino-silane, wherein the functionalised elastomeric polymer comprises at least one functional group chosen from carboxylic groups, carboxylate groups, anhydride groups, ester groups, epoxy groups, and mixtures thereof.

2. The tyre according to claim 1, wherein the functionalised elastomeric polymer comprises an elastomeric polymer chosen from polybutadiene, styrene/1,3-butadiene copolymers, styrene/isoprene/1,3-butadiene copolymers, styrene/1,3-butadiene/acrylonitrile copolymers, and mixtures thereof.

3. The tyre according to claim 1, wherein the functionalised elastomeric polymer comprises styrene/1,3-butadiene copolymers.

4. The tyre according to claim 1, wherein the tyre comprises:

a carcass structure, having opposite side edges associated with a respective left and right bead structures;

a tread band applied in a radially external position with respect to the carcass structure; and a pair of sidewalls laterally applied on the opposite sides of the carcass structure, wherein the structural element is at least one of the tread band and the pair of sidewalls.

5. The tyre according to claim 1, wherein the elastomeric composition comprises from about 7% to about 12% by weight, with respect to the amount of white reinforcing filler, of the silane mixture.

6. The tyre according to claim 1, wherein the mixture of silanes comprises from 50% to 99% by weight, with respect to the total quantity of the mixture, of at least one sulfur-silane, and from 50% to 1% by weight, with respect to the total quantity of the mixture, of at least one amino-silane.

7. The tyre according to claim 1, wherein the mixture of silanes comprises from 60% to 90% by weight, with respect to the total quantity of the mixture, of at least one sulfur-silane, and from 40% to 10% by weight, with respect to the total quantity of the mixture, of at least one amino-silane.

8. The tyre according to claim 1, wherein the silane mixture comprises from 70% to 90% by weight, with respect to the total quantity of mixture, of at least one sulfur-silane, and from 30% to 10% by weight, with respect to the total quantity of mixture, of at least one amino-silane.

9. The tyre according to claim 1, wherein the silane mixture comprises at least one amino-silane of formula (I):

$$(R)_3Si-C_nH_{2n}-[X-C_mH_{2m}]_p-Y \qquad (I)$$

wherein

R, wherein each R is equal or different to each other, are chosen from alkyl or alkoxy groups having 1 to 4 carbon atoms, provided that at least one R group is an alkoxy group;

n and m, equal or different each other, are an integer ranging from 1 to 6 inclusive;

p is an integer ranging from 0 to 5 inclusive;

X is a group —NH—, and

Y is a group —NH$_2$ to NHR', wherein R' is an alkyl or cycloalkyl group ranging from 1 to 6 carbon atoms.

10. The tyre according to claim 1, wherein the silane mixture comprises at least one sulfur-silane of formula (II):

$$(R)_3Si-C_nH_{2n}-X \qquad (II)$$

wherein

X is a mercapto group (—SH), or —(S)$_m$C$_n$H$_{2n}$—Si—(R)$_3$

R, wherein each R is equal or different each other, are chosen from alkyl or alkoxy groups having from 1 to 4 carbon atoms, provided that at least one R group is an alkoxy group; and n and m, equal or different each other, are an integer ranging from 1 to 6 inclusive.

11. The tyre according to claim 1, wherein the amino-silane is chosen from 2-aminoethyl-trimethoxysilane, 2-aminoethyl-triethoxysilane, 2-aminoethyl-tripropoxysilane, 2-aminoethyl-tributoxysilane, 3-aminopropyl-trimethoxysilane, 3-aminopropyl-triethoxysilane (APTES), 3-aminopropyl-methyldiethoxysilane, 3-aminopropyl-methyldimethoxysilane, 3-aminopropyl-diisopropylethoxysilane, 3-aminopropyltris-(methoxyethoxyethoxy)silane, 3-aminopropyl-diisopropyletoxy silane, 3-(2-aminomethylamino)propyl-triethoxysilane, 3-(2-(2-aminoethylamino)ethylamino)propyl-trimethoxysilane, 4-aminobutyl-triethoxysilane, 4-aminobuthyldimethyl-methoxysilane, 4-aminobutyl-triethoxysilane, N-(2-aminoethyl)aminomethyl-triethoxysilane, N-(2-aminoethyl)-3-aminopropyl-trimethoxysilane (also known as N-[3-(trimethoxysilyl)propyl]ethylenediamine (EDTMS)), N-(2-aminoethyl)-3-aminopropyl-triethoxysilane, N-(2-aminoethyl)-3-aminopropyl-tris(2-ethylhoxy) silane, N-(2-aminoethyl)-3-aminopropyl-methyldimethoxysilane, N-(2-aminoethyl)-3-aminopropyl-methyldiethoxysilane, N-(2-aminoethyl)-3-aminoisobutyl-methyldimethoxysilane, N-(6-aminohexyl)-3-aminopropyl-trimethoxysilane, N-(6-aminohexyl)-3-aminopropyl-triethoxysilane, N-2-(vinylbenzylamino)-ethyl-3-aminopropyl-trimethoxysilane, N-cyclohexyl(aminomethyl)methyldiethoxysilane, N-cyclohexyl(aminomethyl)triethoxysilane, N-cyclohexyl(aminomethyl)trimethoxy silane, N-cicloesyl-3-aminopropyl-trimethoxysilane, N-(n-butyl)-3-aminopropyl-trimethoxysilane, N-(n-butyl)-3-aminopropyl-triethoxysilane, N-(n-butyl)-aminomethyl-triethoxysilane, N,N-diethylaminopropyltrimethoxysilane, N,N-dimethylaminopropyltrimethoxysilane, and N,N-diethylaminomethyltriethoxysilane.

12. The tyre according to claim 1, wherein the sulfur-silane is chosen from bis[3-(trimethoxysilyl)propyl]-tetrasulphane (TESPT), bis[3-(triethoxysilyl)propyl]-disulphane (TESPD), bis[2-(trimethoxysilyl)ethyl]-tetrasulphane, bis [2-(triethoxysilyl)ethyl]-trisulphane, bis[3-(trimethoxysilyl)propyl]-disulphane, (1-mercaptomethyl)triethoxysilane, (2-mercaptoethyl)triethoxysilane, (3-mercaptopropyl)triethoxysilane, (3-mercaptopropyl)methyldiethoxysilane, (3-mercaptopropyl)methyldimethoxysilane, (3-mercaptopropyl)trimethoxysilane, 3-octanoylthio-1-propyltriethoxysilane and (2-mercaptoethyl)tripropoxysilane.

13. The tyre according to claim 1, wherein the mixture of silanes comprises (i) at least one amino-silane chosen from (3-aminopropyl)triethoxysilane (APTES), (3-aminopropyl)trimethoxysilane, N-(2-aminoethyl)-3-aminopropyltrimethoxysilane, and N-(2-aminoethyl)-3-aminopropyltriethoxysilane, and (ii) at least one sulfur-silane chosen from bis[3-(trimethoxysilyl)propyl]-tetrasulphane (TESPT), bis [3-(triethoxysilyl)propyl]-disulphane (TESPD), and (3-mercaptopropyl) trimethoxy silane.

14. A cross-linkable elastomeric composition, wherein the cross-linkable elastomeric composition comprises per 100 phr of vulcanisable polymer:

100 phr of vulcanisable polymer consisting of (1) from 90 phr to 10 phr of at least one non-functionalised elastomeric polymer; and (b) from 10 phr to 90 phr of at least one functionalised elastomeric polymer;

(c) from about 10 phr to about 120 phr of at least one white reinforcing filler;

(d) from about 5% to about 15% by weight with respect to an amount of the at least one white reinforcing filler of a mixture of silanes, wherein the mixture comprises at least one sulfur-silane and at least one amino-silane, wherein the functionalised elastomeric polymer comprises at least one functional group chosen from carboxylic groups, carboxylate groups, anhydride groups, ester groups, epoxy groups, and mixtures thereof.

15. The tyre according to claim 1, wherein the tyre comprises from about 20 phr to about 90 phr of at least one white reinforcing filler.

16. The composition according to claim 14, wherein the composition comprises from about 20 phr to about 90 phr of at least one white reinforcing filler.

\* \* \* \* \*